United States Patent
Sugo et al.

(10) Patent No.: US 6,228,135 B1
(45) Date of Patent: *May 8, 2001

(54) PURIFICATION OF VERY SLIGHTLY CONTAMINATED AIR WITHIN A CLEAN ROOM

(75) Inventors: Takanobu Sugo, Gunma-ken; Kunio Fujiwara, Kanagawa-ken; Hideaki Sekiguchi, Chiba-ken; Takeshi Takai; Atsushi Kobayashi, both of Kanagawa-ken, all of (JP)

(73) Assignees: Ebara Corporation; Japan Atomic Research Institute, both of Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/629,332

(22) Filed: Apr. 8, 1996

Related U.S. Application Data

(63) Continuation of application No. 08/143,887, filed on Nov. 1, 1993, now abandoned.

(30) Foreign Application Priority Data

Nov. 2, 1992 (JP) .................................................. 4-294501

(51) Int. Cl.[7] .......................... B01D 24/00; B01D 39/04; B01D 39/16; B01D 46/00
(52) U.S. Cl. ........................... 55/528; 95/287; 423/210
(58) Field of Search ........................ 454/187; 95/287, 95/286; 55/528, 527; 423/210, 240 S, 237

(56) References Cited

U.S. PATENT DOCUMENTS

| | | | |
|---|---|---|---|
| 4,120,813 | * 10/1978 | Hatanaka et al. | 526/264 |
| 4,157,376 | * 6/1979 | Vulikh et al. | 423/240 S |
| 4,980,335 | * 12/1990 | Sugo et al. | 423/230 |
| 5,195,922 | * 3/1993 | Genco | 454/187 |
| 5,225,000 | * 7/1993 | Fujii et al. | 422/24 |
| 5,308,467 | * 5/1994 | Sugo et al. | 204/301 |
| 5,743,940 | * 4/1998 | Sugo et al. | 95/285 |

FOREIGN PATENT DOCUMENTS

| | | | |
|---|---|---|---|
| 3910874 | * 10/1989 | (DE) . | |
| 2238055 | 5/1991 | (GB) . | |
| 51-103090 | * 9/1976 | (JP) | 55/528 |
| 61-271012 | * 12/1986 | (JP) | 55/527 |
| 63-12315 | 1/1988 | (JP) . | |
| 63-49228 | * 3/1988 | (JP) | 423/245.1 |
| 63-91116 | * 4/1988 | (JP) | 55/527 |
| 3-60710 | 3/1991 | (JP) . | |
| 3-60711 | 3/1991 | (JP) . | |
| 4-193314 | 7/1992 | (JP) . | |
| 4-247207 | * 9/1992 | (JP) . | |
| 4-28422 | * 10/1992 | (JP) | 423/239.1 |

OTHER PUBLICATIONS

Patent Abstracts of Japan, vol. 11, No. 267 (C–443) Aug. 28, 1987 of JP–A 62–068509 (Toray Ind. Inc.) Mar. 28 1987.
Patent Abstracts of Japan, vol. 17, No. 25 (C–1017) Jan. 18, 1993 of JP–A 04–247207 (Fujitsu Ltd.) Sep. 3, 1992.
Patent Abstracts of Japan, vol. 13, No. 546 (C–661) Dec. 6, 1989 of JP–A 01–224009 (Asahi Chem. Ind. Co. Ltd.) Sep. 7, 1989.
Derwent Abstract of JP–A 4–267918 (Sony Corp.) Sep. 24, 1992.

* cited by examiner

*Primary Examiner*—Steven P. Griffin
*Assistant Examiner*—Maribel Medina
(74) *Attorney, Agent, or Firm*—Armtrong, Westerman, Hattori, McLeland & Naughton

(57) ABSTRACT

An air purifying filter which comprises: (a) an ion-exchange fiber filter and (b) a high- or ultrahigh-performance filter comprising glass fibers is disclosed. The ion-exchange fiber filter preferably comprises a fibrous substrate and ion-exchange groups and hydrophilic groups which are chemically bound to the surface of the substrate.

3 Claims, 1 Drawing Sheet

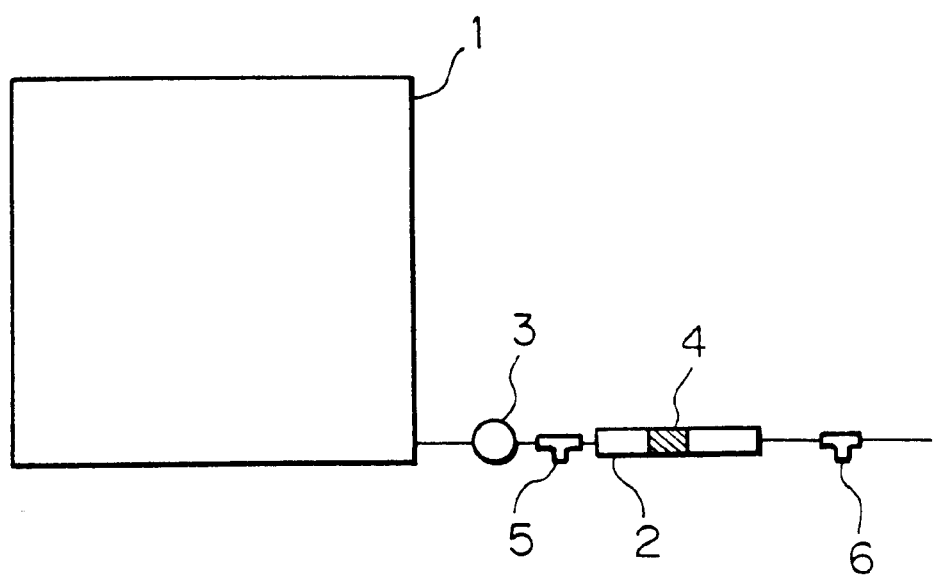

PURIFICATION OF VERY SLIGHTLY CONTAMINATED AIR WITHIN A CLEAN ROOM

This application is a Continuation of application Ser. No. 08/143,887 filed Nov. 1, 1993, now abandoned.

BACKGROUND OF THE INVENTION

This invention relates to an apparatus and method for purifying air within a clean room that has been contaminated with fine particles or trace amounts of gases or ions.

The use of "clean rooms" is not limited to high-technology areas including the semiconductor industry, precision machine/engineering industry, photographic industry, and the pharmaceutical manufacturing industry and hospitals (where they are used as "biological clean rooms"). Today, the use of clean rooms has expanded to the food industry, agriculture and even to their peripheral fields. The working environments of these industrial areas should satisfy various conditions, among which temperature, humidity, air stream, as well as air purification are extremely important.

For purifying the air to be used in those industries, high-performance filters are used, such as high-efficiency particulate air (HEPA) filters which are composed of glass fibers, and more efficient ultra-low penetration air (ULPA) filters. Prefilters of these high-performance filters are also used and common types are moderate-performance, coarse dust filters which are composed of synthetic fiber other than glass fibers.

These filters are intended to reject particles in air and are capable of efficient rejection of fine particles as small as about 0.1 $\mu$m. However, these filters which depend upon the physical sifting action for the removal of fine particles have difficulty in rejection gases or ions.

In the existing LSI fabrication plants, the contamination of the surfaces of semiconductor wafers is held to be caused by either fine particles or gases and ions. Contamination by gases and ions is particularly important since it causes such serious problems as increasing the contact resistance of semiconductors or affecting the bulk characteristics of semiconductor wafers.

There are various sources of gases and ions; for example, they are generated in semiconductor fabrication steps such as etching or they originate from the finishing materials of the clean room or they are brought in when atmospheric air is introduced into the fabrication process. The gases or ions once introduced into the clean cannot be rejected by the conventional air purifying system and they build up progressively in the room to cause potential adverse effects not only on the quality of the final product but also on the health of the operator.

Hence, rejection of the gases or ions that have entered the clean room is of a particularly great concern today.

As mentioned above, no effective method is currently available to remove the trace amounts or gases of ions that have been introduced into the clean room, except that active charcoal filters as well as magnanese oxide supporting catalyst filters are known as gas or ion removing means.

Charcoal exhibits a certain degree of ability to remove various gases but its ability to absorb polar gases is poor, particularly in the case of basic gases such as ammonia. Further, the mechanism of adsorption of gases on charcoal is by physical adsorption, so if the amount of gas adsorption increases, the chance of re-liberation of the adsorbed gas will also increase. In addition, charcoal will easily disintegrate into a powder form and can potentially become a source of generation of fine particles.

Manganese oxide supporting catalyst filters are too low in the efficiency of gas removal to be suitable for the purpose of removing gas components that are present at extremely low concentrations in the clean room. On the contrary, it has been reported that the filters are sources of generation of harmful gases in trace amounts.

Besides the use of such filters, wet adsorbers which use liquid chemicals are also known as a means of removing gases or ions. Such adsorbers are bulky and require cumbersome procedures of maintenance and management. In addition, they were initially developed as apparatus for removing high concentrations of gaseous components and, hence, are not suitable for the purpose of removing gaseous components that are present in trace amounts.

Japanese Patent Public Disclosure No. 12315/1988 proposed a method for removing acidic or alkaline gases by means of a filter formed from a blend of ion-exchange fibers and glass fibers. This method is applicable to the purification of air in household or business offices but it cannot be applied with great effectiveness to the clean room in the semiconductor industry and other sites where rigorous performance requirements need be satisfied. This is because i) the ion-exchange fibers per se are frequent sources of dust generation, ii) the ability to remove fine particles is unsatisfactory, and iii) high susceptibility to moisture and other factors instabilizes the ability to remove gaseous components.

Japanese Patent Public Disclosure Nos. 60710/1991 and 60711/1991 proposed shaping mixtures of ion-exchange fibers and non-ion-exchange fibers into filters that were primarily intended to remove ion components. The materials to be rejected by these filters are somewhat different from the filter proposed by Japanese Patent Public Disclosure No. 12315/1988, supra but one may well consider that the two inventions have technically the same problems.

SUMMARY OF THE INVENTION

The present invention has been accomplished under these circumstances and has as an object providing a filter that is capable of rejecting gases or ions that are present in trace amounts in air.

Another object of the present invention is to provide a method of purifying air in a clean room that has been contaminated with fine particles or those gases or ions which are present in trace amounts.

In accordance with the present invention,there is provided an ion-exchange fiber filter that is composed of a fibrous substrate, as well as ion-exchange and hydrophilic groups that are chemically bound to the surface of said substrate.

In accordance with the present invention, there is provided an air purifying filter which comprises an ion-exchange fiber filter and a high- or ultrahigh-performance filter comprising glass fibers.

In accordance with the present invention, there is also provided a method of purifying very slightly contaminated air within a clean room which comprises allowing air within a clean room to be passed through an ion-exchange fiber filter and a high- or ultrahigh-performance filter comprising glass fibers.

BRIEF DESCRIPTION OF THE DRAWING

The FIGURE is a diagram showing the layout of equipment for testing the performance of the present invention in removing noxious gases that are present in trace amounts.

DESCRIPTION OF THE PREFERRED EMBODIMENT

The filter that is composed of ion-exchange fibers can be used as a coarse-dust filter, a prefilter or a moderate-performance filter. Alternatively, it can be used at a stage that precedes or follows the use of those filters.

The filter that is composed of ion-exchange fibers rejects a comparatively coarse part of the gases or ions as well as fine particles that are contaminants for the air in the clean room. The finer particles are rejected by the high- or ultrahigh-performance filter at a subsequent stage that are composed of glass fibers.

The filter that is composed of ion-exchange fibers may be used in close contact with the filter that is composed of glass fibers. If desired, the two filters may be spaced from each other as in the case where a fan is interposed between the two.

Conventional ion-exchange resins are beaded and it has been difficult to form them into desired shapes; what is more, they have been sources of generation of fine particles. In addition, the conventional ion-exchange resins which are manufactured by polymerizing monomers that have ion-exchange groups are characterized in that part of their backbone is composed of ion-exchange groups. In contrast, the ion-exchange fibers that are used in the present invention are composed of a substrate and ion-exchange groups that are chemically bound to the surface of the substrate. The substrate not only imparts desired strength to the ion-exchange fibers but it also helps improve their processability and shapability. The ion-exchange groups, on the other hand, help adsorb and remove gases or ions. Furthermore, the ion-exchange groups which are present on the surface of the substrate are capable of efficient gas or ion adsorption. Thus, the ion-exchange fibers differ basically from the conventional ion-exchange resins in that the substrate and the ion-exchange fibers perform different functions.

The filter under consideration may be solely composed of ion-exchange fibers. In this case, the ion-exchange fibers may be monofilaments or they may be in the form of, woven or nonwoven fabrics which are assemblies of monofilaments, other porous materials or processed products thereof. The fibers may be either continuous filaments or staple fibers. Exemplary nonwoven fabrics are spun bonded fabrics and melt blown nonwoven fabrics. If desired, the ion-exchange fibers may be blended with non-ion-exchange fibers, as exemplified by fibers made of ordinary organic high polymers, inorganic fibers such as glass and ceramic fibers, metal fibers, and active charcoal fibers. Alternatively, the ion-exchange fibers and non-ion-exchange fibers may be superposed in separate layers. The diameter of the fiber is about 5 to about 100 $\mu$m, preferably about 15 to about 30 $\mu$m.

The method for causing the ion-exchange groups to be chemically bound to the surface of the substrate is not limited in any particular way and any known methods may be employed; however, an optimum method is by radiation-initiated graft polymerization. Ionizing radiations that can be used in this method include $\alpha$-, $\beta$-, $\gamma$-rays, electron beams, ultraviolet rays and X-rays. While any of these radiations can be used, $\gamma$-rays and electron beams are particularly suitable for use in the present invention.

Radiation-initiated graft polymerization may be performed by one of two approaches, the simultaneous process in which radiations are applied in the copresence of the substrate and monomers, and the pre-irradiation process, in which the substrate is irradiated prior to contact with the monomers. While either method can be used in the present invention, the pre-irradiation process is more advantageous since it involves less formation of homopolymers of the monomers.

In the method of radiation-initiated graft polymerization, monofilaments, woven or nonwoven fabrics which are assemblies of monofilaments, processed products thereof, or porous materials can be used as the substrate of the ion-exchange fibers. Thus, a capability for removing gases or ions can be introduced into filter materials that already have the ability to reject particles and this makes the adoption of radiation-initiated graft polymerization effective for the purposes of the present invention.

What is more, the ion-exchange fibers which are charged both positively and negatively on the surface have a potential to perform electrostatic adsorption and, hence, can impart better performance in the rejection of fine particles.

Various kinds of filters including coarse-dust filters and moderate-performance filters are presently used as prefilters for HEPA and ULPA filters primarily for the purpose of rejecting particles. If ion-exchange groups are introduced into these filter materials by radiation-initiated graft polymerization, they are provided with the ability to reject both fine particles and deleterious gases or ions simultaneously without increasing the pressure loss; this is another reason why the adoption of radiation-initiated graft polymerization is advantageous for the purposes of the present invention.

For gases and ions to be rejected consistently by means of the ion-exchange fibers, it is preferred that both ion-exchange and hydrophilic groups are present on the surface of those fibers. This is because the efficiency of gas or ion rejection is largely dependent on the humidity of air and the lower humidity, the less efficient is the rejection of gases or ions.

In the present invention, hydrophilic groups are introduced into the ion-exchange fibers to make them moist enough to insure consistent rejection of gases or ions. The exact reason for this effect is not clear but most probably the introduced hydrophilic groups would accelerate the ionization of gaseous components and the dissociation of ion-exchange groups. While there is no particular limitation on the method for introducing hydrophilic groups but as in the case of ion-exchange groups, hydrophilic groups can be readily introduced by the above-described radiation-initiated graft polymerization.

Among the materials that can be used as the substrate for ion-exchange fibers in the present invention are organic high polymers, as exemplified by polyolefins (e.g. polyethylene and polypropylene), halogenated polyolefins (e.g. PTFE and PVC) and olefin-halogenated olefin copolymers (e.g. ethylene-tetrafluoroethylene). These polymers are sometimes collectively referred to as "polyolefins".

The ion-exchange groups that may be introduced into the substrate are cation- and/or anion-exchange groups. Practical examples of cation-exchange groups include a sulfone group, carboxyl group and a phosphate group; practical examples of anion-exchange groups include basic ion-exchange groups such as a strong basic quaternary ammonium group and lower amine containing weak basic groups. Suitable ion-exchange groups may be selected in consideration of various factors including the type of gaseous components in the air to be treated, the size of fine particles to be rejected, and the performance required of the filter as the final product. Since the situation under which the air purifying filter of the present invention can be used is versatile, both cation- and anion-exchange groups may be introduced into a single substrate or, alternatively, cation-exchange fibers may be used in combination with anion-exchange fibers.

These ion-exchange groups may be introduced either by grafting the monomers having ion-exchange groups onto the surface of the substrate or by first grafting the monomers capable of conversion to ion-exchange groups onto the surface of the substrate and then performing a secondary reaction to effect conversion to the ion-exchange groups for introduction into the substrate. The secondary reaction leads the introduction into the substrate of, for example, sulfone group and amine groups such as dimethylamine and diethylamine.

The monomers having ion-exchange groups include those which contain cation-exchange groups and those which contain anion-exchange groups. The former type of monomers include, but are not limited by, acrylic acid, methacrylic acid, crotonic acid, itaconic acid, sodium vinylsulfonate, sodium arylsulfonates, sodium styrenesulfonate, 2-acrylamido-2-methylpropanesulfonic acid, and phosphorus-containing acrylic acid esters. The latter type of monomers include, but are not limited by, arylamines, quaternized products of chloromethylstyrene, and amino alkyl esters of acrylic acid.

The monomers that can be converted to ion-exchange groups include, but are not limited by, styrene, chloromethylstyrene, vinylpyridine, glycidyl acrylate, glycidyl methacrylate, acrylonitrile and acrolein. Styrene can be converted into sulfone group or secondary, tertiary amine groups or quaternary ammonium groups. Chloromethylstyrene can be converted into amine group by the reaction with amines. Vinylpyridine can be converted into quaternary ammonium groups by the reaction with alkyl halogenates. Glycidyl acrylate and glycidyl methacrylate can be converted into sulfone group, secondary or tertiary amine groups or quaternary ammonium groups.

The monomers having hydrophilic groups include, but are not limited by, nonionic compounds such as acrylamide, methacrylamide, and 2-hydroxyethyl methacrylate. The above-mentioned monomers having common ion-exchange groups can also be used as a class of hydrophilic monomers. Acrylamide and methacrylamide carry, as hydrophilic groups, amide groups and 2-hydroxyethyl methacrylate carriers a hydroxy group.

In accordance with the present invention, there is provided an air purifying filter that consists of the above-described ion-exchange fiber filter and a high- or an ultrahigh-performance filter that are composed of glass fibers. Examples of the high- or ultrahigh-performance filter that is composed of glass fibers include, but are not limited by, HEPA and ULPA filters. The HEPA filters are used as a final filter for clean rooms of class 100 to 10,000. The ULPA filters are used as a final filter for clean rooms of class 1 to 10. Such HEPA and ULPA filters are described in, for example, NON WOVENS REVIEW, May, 1990.

The present invention provides a means for achieving enhanced purification of air not only in "industrial" clean rooms such as those employed in the semiconductor, precision machine/engineering and photographic industries but also in "biological" clean rooms such as those employed in the pharmaceutical manufacturing and food industries, as well as in hospitals. Furthermore, the performance of existing air purifiers can be improved by merely modifying the construction of filter materials they use and there is no need to install bulky equipment. Thus, according to the present invention, the quality and yield of the products that are manufactured in the semiconductor and other industries are improved while, at the same time, the reliability in the safety and hygienic aspects of hospitals and the pharmaceutical manufacturing industry is so much improved as to make great contribution to the social benefit.

The following examples are provided for the purpose of further illustrating the present invention but are in no way to be taken as limiting.

EXAMPLE 1

A particle rejecting filter that was composed of a nonwoven polypropylene fabric having a fiber diameter of 30 $\mu$m was exposed to electron beams from an accelerator (acceleration voltage, 2 Mev; beam current, 1 mA) for a total dose of 200 kGy in a nitrogen atmosphere. Subsequently, the nonwoven fabric was immersed in a mixed solution of 50% 2-hydroxyethyl methacrylate and 50% glycidyl methacrylate, and graft polymerization was conducted at 50° C. for 8 h. As a result, 163% grafting was achieved. The nonwoven fabric thus treated was then immersed in a 10% aqueous solution of iminodiethanol at 50° C. and amination was conducted for 2 h. This procedure yielded a nonwoven fabric that was made of weak basic anion-exchange fibers having an ion-exchange capacity of 2.5 meq/g and into which hydrophilic groups had been introduced. The ion-exchange group and the hydrophilic group were tertiary amine group and hydroxy group, respectively.

The air purifying performance of this nonwoven fabric was checked by a test apparatus having the layout shown in FIG. 1. A glass column 2 having an inside diameter of 15 mm was packed with 0.5 g of the nonwoven fabric which is indicated by 4 in FIG. 1. Hydrogen fluoride (20 ppb) in a tetra-bag 1 was admitted through the column 2 at a flow rate of 3 L/min; the concentration of hydrogen fluoride was found to be 2 ppb or less at the exit 6 of the column.

EXAMPLE 2

A composite nonwoven fabric made of polyethylene and polypropylene fibers having a fiber diameter of ca. 30 $\mu$m was exposed to $\gamma$-rays for a total dose of 200 kGy in a nitrogen atmosphere. Then, the nonwoven fabric was immersed in an aqueous solution containing 30% acrylic acid and 20% sodium styrenesulfonate as a monomer containing hydrophilic groups, and graft polymerization was conducted at 45° C. for 8 h. This procedure yielded a nonwoven fabric that was composed of cation-exchange fibers having an ion-exchange capacity of 4.6 meq/g. The ion-exchange groups were a carboxyl group and sulfone group. In this example, the ion-exchange group served as a hydrophilic group.

The air purifying performance of this nonwoven fabric was tested as in Example 1, except that hydrogen fluoride was replaced by 75 ppb of ammonia. The concentration of ammonia was found to be 5 ppb or less at the exit of the column.

EXAMPLE 3

The nonwoven fabrics that were produced in Examples 1 and 2 were each used a a prefilter and installed at a stage preceding a HEPA filter. Air in a room was passed through the filter assembly at a velocity of 3 cm/s. The passage of fine particles (0.1–0.2 $\mu$m) was found to be 4.5% at the exit of each prefilter and 0.005% at the exit of the HEPA filter. It is clear from the results of Examples 1 and 2 that the air purifying filters produced In accordance with the present invention were capable of rejecting not only fine particles but also deleterious gases.

Comparative Example 1

The nonwoven fabrics that were yet to be subjected to graft polymerization in Examples 1 and 2 were each used as a prefilter and installed at a stage prior to a HEPA filter. Air in a room was filtered under the same condition as in Example 3; the passage of fine particles (0.1–0.2 μm) was found to be 23% at the exit of each prefilter and 0.01% at the exit of the HEPA filter.

EXAMPLE 4

Polypropylene monofilaments having a diameter of ca. 10 μm were exposed to γ-rays for a total dose of 200 kGy and a part of the irradiated monofilaments were subjected to graft polymerization through contact with a mixed solution consisting of 2-hydroxyethyl methacrylate and acrylic acid. This procedure yielded carboxyl group-containing fibers at a graft ratio of 133% that had an ion-exchange capacity of 4.8 meq/g. The remainder of the monofilaments were also subjected to graft polymerization through contact with a mixed solution consisting of 2-hydroxyethyl methacrylate and glycidyl methacrylate. The graft ratio that was attained in this stage was 153%. The thus treated filaments were subjected to amination by immersion in an aqueous solution of iminodiethanol. These procedures yielded tertiary amine group-containing fibers having an ion-exchange capacity of 2.4 meq/g.

These ion-exchange fibers were blended with the same weight of glass fibers having a diameter of about 10 μm and a fiber length of about 10 to about 20 mm, and the mixture was processed by a wet papermaking process to produce a composite prefilter. This prefilter was installed at a stage prior to a HEPA filter and air in a room was passed through the filter assembly at a velocity of 3 cm/s. The passage of fine particles (0.1–0.2 μm) was 3.9% at the exit of the prefilter and 0.004% at the exit of the HEPA filter.

The air purifying performance of this prefilter was also tested as in Example 1; the concentration of hydrogen fluoride was found to be 2 ppb or less at the exit of the column.

The above results demonstrate that the prefilter containing ion-exchange fibers as used in combination with the HEPA or ULPA filter which are made of glass fibers are capable of enhanced purification of fine particles as well as gases and ions that are contained as trace contaminants in air in the clean room.

What is claimed is:

1. An air purifying filter for simultaneously removing fine particles and trace amounts of ions from air within a clean room, which comprises:
 a) an ion-exchange fiber filter consisting of ion-exchange fiber and
 b) a filter which removes fine particles,
  wherein the ion-exchange fiber filter a) removes particles and trace amounts of ions and the filter b) removes finer particles than those particles removed by the ion-exchange fiber filter a),
  the ion-exchange fiber consisting of a fibrous substrate, an ion-exchange group and a hydrophilic group,
  the groups are chemically bonded to a polymerizable monomer which is graft polymerized as a side chain branch on the fibrous substrate, and
  the ion-exchange fiber is obtained by exposing a polyolefin fiber to an ionizing radiation and the graft polymerizing onto the exposed polyolefin fiber a polymerizable hydrophilic monomer which is selected from the group consisting of acrylamide, methacrylamide, N, N-dimethyl acrylamide and 2-hydroxyethyl methacrylate and a polymerizable monomer having an ion-exchange group which is selected from the group consisting of quaternized products of chloromethyl styrene and sodium styrenesulfonate.

2. An air purifying filter for simultaneously removing fine particles and trace amounts of ions from air within a clean room, which comprises:
 a) an ion-exchange fiber filter consisting of ion-exchange fiber and
 b) a filter which removes fine particles,
  wherein the ion-exchange fiber filter a) removes particles and trace amounts of ions and the filter b) removes finer particles than those removed by the ion-exchange fiber filter a),
  the ion-exchange fiber consisting of a fibrous substrate, an ion-exchange group and a hydrophilic group,
  the groups are chemically bonded to a polymerizable monomer which is graft polymerized as a side chain on the fibrous substrate, and
  the ion-exchange fiber is obtained by exposing a polyolefin fiber to an ionizing radiation and then graft polymerizing onto the exposed polyolefin fiber a polymerizable hydrophilic monomer having an ion-exchange group which is selected from the group consisting of acrylic acid, methacrylic acid, dimethylamino-ethylmethacrylate, diethylamino-ethylmethacrylate and N,N-dimethylarnino-propylacrylamide and apolymerizable monomer having an ion-exchange group which is selected from the group consisting of sodium styrenesulfonate, sodium vinylsulfonate, sodium arylsulfonate and quaternized products of chloromethyl styrene.

3. An air purifying filter for simultaneously removing fine particles and trace amounts of ions from air within a clean room, which comprises:
 a) an ion-exchange fiber filter consisting of ion-exchange fiber and
 b) a filter which removes fine particles,
  wherein the ion-exchange fiber filter a) removes particles and trace amounts of ions and the filter b) removes finer particles than those removed by the ion-exchange fiber filter a),
  the ion-exchange fiber consisting of a fibrous substrate, an ion-exchange group and a hydrophilic group,
  the groups are chemically bonded to a polymerizable monomer which is graft polymerized as a side chain branch on the fibrous substrate, and
  the ion-exchange fiber is obtained by exposing a polyolefin fiber to an ionizing radiation and then graft polymerizing onto the exposed polyolefin fiber a glycidyl methacrylate or glycidyl acrylate.

* * * * *